Sept. 15, 1953 M. DE GROOTE 2,652,394
CERTAIN OXYALKYLATED DERIVATIVES OF SUCROSE
Filed Feb. 27, 1950
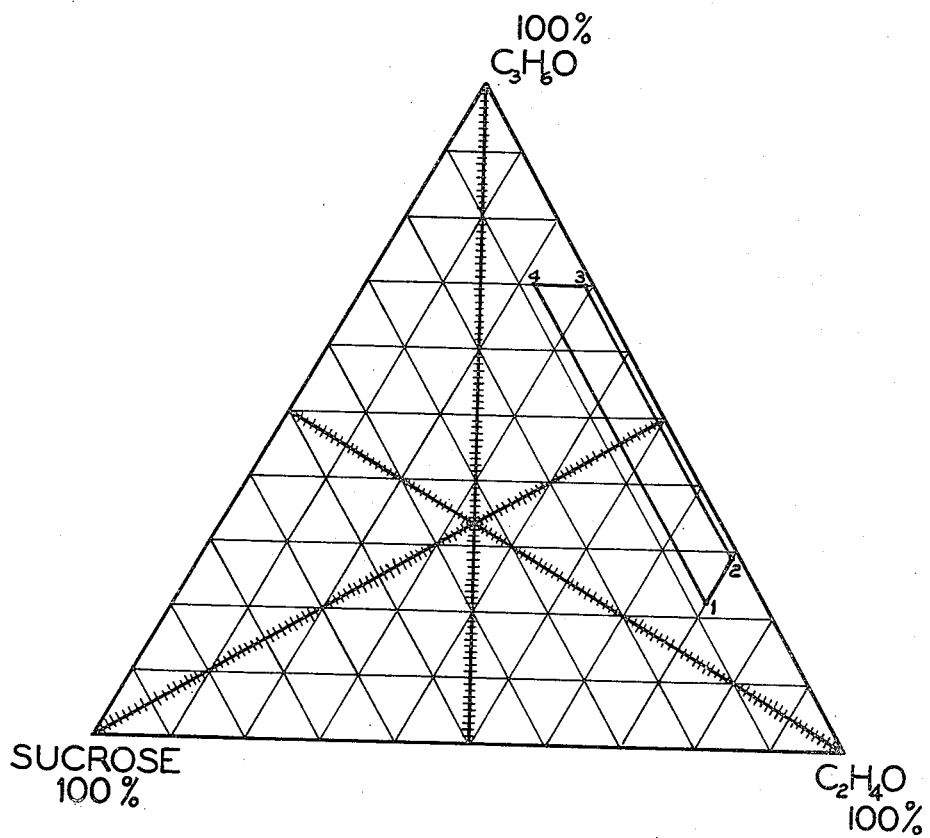
*Melvin De Groote*
INVENTOR

UNITED STATES PATENT OFFICE 2,652,394

CERTAIN OXYALKYLATED DERIVATIVES OF SUCROSE

Melvin De Groote, University City, Mo., assignor to Petrolite Corporation, a corporation of Delaware Application February 27, 1950, Serial No. 146,484

2 Claims. (Cl. 260—209)

The present invention is concerned with certain new chemical products, compounds, or compositions which have useful application in various arts. It includes methods or procedures for manufacturing said new chemical products, compounds, or compositions, as well as the products, compounds, or compositions themselves.

More specifically the present invention is concerned with xylene-soluble oxyalkylated sucrose. The alkylene oxides employed for oxyalkylation are alpha-beta alkylene oxides selected from the class consisting of ethylene oxide, propylene oxide, butylene oxide, glycide and methylglycide. In numerous instances the oxyalkylation products are characterized by the fact that they are not only xylene soluble but also water-insoluble. Such products are obtained by the use, at least in part, of an alkylene oxide having three or more carbon atoms per oxygen atom such as propylene oxide. One example of such an oxyalkylated is obtained by reacting 9 parts by weight of sucrose with 91 parts by weight of propylene oxide. On the other hand many of the most desirable derivatives are obtained by use of both ethylene oxide and propylene oxide.

Part of the products herein described, i. e., the oxypropylated derivatives, specially represent a continuation-in-part of my co-pending application, Serial No. 104,801, filed July 14, 1949, now Patent No. 2,552,528.

Briefly stated, the particular invention described in said immediately aforementioned co-pending application is concerned with the breaking of petroleum emulsions by means of certain polyol ethers hereinafter described in detail. Such ethers are obtained by treating a water-soluble xylene-insoluble polyhydric reactant having at least 4 hydroxyl radicals and free from any radical having at least 8 uninterrupted carbon atoms, with propylene oxide.

In the aforementioned co-pending application, Serial No. 104,801, filed July 14, 1949, one is concerned with an initial material which, like sucrose, is water-soluble and xylene-insoluble. Furthermore, the reactant subjected to oxyalkylation as described in said aforementioned application, like sucrose has at least 4 hydroxyl radicals and is free from any radical having at least 8 uninterrupted carbon atoms. In said aforementioned co-pending application the particular reactant employed is propylene oxide, whereas the instant invention is not so limited.

For convenience, however, reference will be made to the effect of oxypropylation for the reason that it illustrates one of the sub-genera herein described, and also for the reason that it particularly illustrates the effect of water solubility.

What is said in aforementioned co-pending application Serial No. 104,801, filed July 14, 1949, applies with equal force and effect to such sub-genus. The following text is verbatim: "A plurality of propylene oxide is used in molal ratio to the hydroxylated reactant so as to convert the initially water-soluble and xylene-insoluble product in an ultimate resultant which is water-insoluble and xylene-soluble. For instance, the herein described resultants, or more correctly products of reaction since they invariably and inevitably represent cogeneric mixtures rather than a single component, which mixed with distilled water so as to give a 5% solution, suspend after a fashion during vigorous agitation but on being allowed to stand in a quiescent state immediately separate out so that within a short length of time, for instance, within a few minutes to several hours, all or substantially the big bulk of material has separated from the aqueous solution or suspension. In fact, in the higher stages of oxypropylation the materials obtained seem to go into water at room temperature with considerable difficulty and if the water happened to be warm, for instance at a temperature of 50°, 60°, or 70° C., the materials were even less soluble. An example of a product difficult to disperse even with vigorous shaking and which, even so, does not stay dispersed, is the resultant obtained by treating one mole of sorbitol with 200 moles of propylene oxide. Reference as to solubility is in ordinary cold water at approximately room temperature, for instance, 22.5° C., or thereabouts. Solubility in xylene refers to solubility at ordinary temperature and products herein specified are soluble in xylene so as to form a 5% solution readily."

In the present invention one is not limited to the use of propylene oxide but one may use oxides which introduce a more concentrated hydrophile character, such as ethylene oxide or glycide. Indeed, such products may show solubility in both xylene and water. This will be illustrated by subsequent examples. Thus, it is noted that in the broadest aspect the invention is concerned with xylene-soluble products whether water-soluble or not.

The compounds or cogeneric mixtures herein described are not only useful for breaking oil field emulsions but also are useful for various other purposes, such as a break-inducer in the doctor treatment of sour hydrocarbons, as an emulsifying agent, as a component in the preparation of micellar solutions, as additive to non-hydrocarbon lubricants, as an intermediate for further reaction by virtue of the terminal hydroxyl radicals, etc.

These products are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

This specific application or use of reagents is described and claimed in co-pending application, Serial No. 146,483, filed February 27, 1950, now Patent No. 2,602,051, granted July 1, 1952.

For convenience, what is said hereinafter is divided into two parts:

Part 1 will be concerned with the description of the oxyalkylation of sucrose, and Part 2 will be concerned with derivatives valuable for various purposes including demulsification but not specifically claimed in the instant application.

PART 1

The oxyalkylation of sucrose can be conducted by various procedures. My preference is to prepare a slurry of finely powdered sugar (confectionery sugar) and xylene, add an alkaline catalyst to the extent of about ½% to 3% and proceed with the oxyalkylation in absence of water. The alkaline catalyst employed may be any one of the customary catalysts such as sodium methylate, caustic soda, caustic potash, etc. Confectionery sugar usually contains about 3% of starch. It is possible that this combines at the temperature of oxyalkylation or it may be there is an insignificant decomposition of sugar itself. In any event, in the early stages of oxyalkylation there is frequently a slightly amber tinge due to caramelization or decolorization of starch which, however, becomes more diluted on addition of the alkylene oxide. Such color can be removed in the usual manner with filtering charcoals, decolorizing clays, etc. For the majority of industrial purposes, however, this color is immaterial. Similarly, the solvent which is present, such as xylene, can be removed if desired.

Distillation, particularly vacuum distillation, can be employed. Here, again, it is immaterial whether the solvent is removed or not when used for most industrial purposes.

I have prepared a number of derivatives from sucrose varying from a few hundred grams or less in the laboratory to substantially larger amounts. In preparing a large number of examples I have found it particularly advantageous to use laboratory equipment which permits continuous oxypropylation and oxyethylation. More specific reference will be made to treatment with glycide subsequently in the text.

The oxypropylation step is, of course, the same as the oxyethylation step insofar that two low boiling liquids are handled in each instance. What immediately follows refers to oxyethylation and it is understood that oxypropylation can be handled conveniently in exactly the same manner.

The oxyethylation procedure employed in the preparation of sucrose derivatives has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometers; emptying outlet; pressure gauge, manual ventline; charge hole for initial reactants; at least one connection for conducting the incoming alkylene oxide, such as ethylene oxide, to the bottom of the autoclave; along with suitable devices for both cooling and heating the autoclave, such as a cooling jacket and, preferably, coils in addition thereto, with the jacket so arranged that it is suitable for heating with steam or cooling with water, and further equipped with electrical devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly ethylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxyethylations become uniform in that the reaction temperature could be held within a few degrees of any selected point in this particular range. In the early stages where the concentration of catalyst is high the temperature was generally set for around 150° C. or thereabouts. Subsequently temperatures up to 170° C. or higher may be required. It will be noted by examination of subsequent examples that this temperature range was satisfactory. In any case, where the reaction goes more slowly a higher temperature may be used, for instance, 165° C. to 180° C., and if need be 185° C. to 190° C. Incidentally, oxypropylation takes place more slowly than oxyethylation as a rule and for this reason we have used a temperature of approximately 160° C. to 165° C., as being particularly desirable for initial oxypropylation, and have stayed within the range of 165° C. to 185° C., almost invariably during oxypropylation. The ethylene oxide was forced in by means of nitrogen pressure as rapidly as it was absorbed as indicated by the pressure gauge on the autoclave. In case the reaction slowed up the temperature was raised so as to speed up the reaction somewhat by use of extreme heat. If need be, cooling water was employed to control the temperature.

As previously pointed out in the case of oxypropylation as differentiated from oxyethylation, there was a tendency for the reaction to slow up as the temperature dropped much below the selected point of reaction, for instance, 170° C. In this instance the technique employed was the same as before, that is, either cooling water was cut down or steam was employed, or the addition of propylene oxide speeded up, or electric heat used in addition to the steam in order that the reaction proceeded at, or near, the selected temperature to be maintained.

Inversely, if the reaction proceeded too fast regardless of the particular alkylene oxide, the amount of reactant being added, such as ethylene oxide, was cut down or electrical heat was cut off, or steam was reduced, or if need be, cooling water was run through both the jacket and the cooling coil. All these operations, of course, are dependent on the required number of conventional gauges, check valves, etc., and the entire equipment, as has been pointed out, is conventional and, as far as I am aware, can be furnished by at least two firms who specialize in the manufacture of this kind of equipment.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities is difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in the co-pending application of Melvin De Groote and Bernhard Keiser, Serial No. 8,822, filed February 16, 1948, and offered for sale by numerous laboratory supply houses. If such arrangement is used to prepare laboratory scale duplications, then care should be taken that the heating mantle can be removed rapidly so as to allow for cooling; or better still, through an added opening at the top the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluid or reactants to mix due to swirling action in the center of the pot. Still better, is the use of a laboratory autoclave of the kind previously described in this part; but in any event, when the initial amount of glycide is added to a suitable reactant, such as sorbitol, the speed of reaction should be controlled by the usual factors, such as (a) the addition of glycide; (b) the elimination of external heat, and (c) use of cooling coil so there is no undue rise in temperature. All the foregoing is merely conventional but is included due to the hazard in handling glycide.

*Example 1b*

The reaction vessel employed was a stainless steel autoclave with the usual devices for heating, heat control, stirrer, inlet, outlet, etc., which is conventional in this type of apparatus. The capacity was approximately 3½ liters. The stirrer operated at a speed of approximately 250 R. P. M. There were charged into the autoclave 460 grams of powdered sugar (containing 3% corn starch) 300 grams of xylene, and 15 grams of sodium methylate. The autoclave was sealed, swept with nitrogen gas and stirring started immediately and heat applied. The temperature was allowed to rise to approximately 150° C. At this particular time the addition of propylene oxide was started. It was added continuously at such speed that it was absorbed by the reaction as added. The amount added in this operation was 1350 grams. The time required to add the propylene oxide was two hours. During this period the temperature was maintained at 150° to 180° C., using cooling water through the inner coils when necessary and otherwise applying heat if required. The maximum pressure during the reaction was 110 pounds per square inch. Ignoring the xylene and sodium methylate and considering the starch a sugar for convenience, the resultant product represent approximately one-fourth sugar and three-fourths propylene oxide. More exactly, the figures are as follows: Sugar 21.8%; propylene oxide 64.0%; and xylene 14.2%. The product, unlike the initial product, was xylene-soluble and water-emulsifiable.

*Example 2b*

The same procedure was followed as in Example 1b, preceding, except that the initial product was the one identified as Example 1b, preceding. 703 grams of this material, excluding xylene, were charged into the autoclave. Acutally there were present 116 grams of xylene residual from the previous example. The 703 grams of reactant represented originally 179 grams of sugar and 524 grams of propylene oxide. To this there were added 8 grams additional of sodium methylate and then 250 grams of ethylene oxide. The ethylene oxide was added in the same manner as propylene oxide but, being more reactive, acted more rapidly. The 250 grams reacted in five minutes time with a temperature varying from 150° to 170° C., with a maximum pressure of 150 pounds per square inch. At the end of this time, ignoring sodium methylate as before, the composition on both a xylene-containing basis and a xylene-free basis, was as follows:

|  | Percent | Percent |
|---|---|---|
| Sugar | 18.8 | 16.75 |
| Propylene Oxide | 55.0 | 49.00 |
| Ethylene Oxide | 26.2 | 23.40 |
| Xylene |  | 10.85 |

The resultant product was both water and xylene-soluble.

*Example 3b*

The same procedure was followed as in Example 2b, preceding, i. e., the initial reactant was the product identified as Example 1b. 788 grams of this material were taken, representing 172 grams of sucrose, 504 grams propylene oxide, and 112 grams xylene. To this there were added 8 grams of sodium methylate and then 1225 grams of propylene oxide in the same manner as in Example 1b. The time required was considerably less in proportion, to wit, 30 minutes. However, during much of this time the temperature of operation was between 180° to 200° C., and the maximum pressure was 150 pounds per square inch. The composition, both on a xylene-free basis and a xylene-containing basis, is shown in the following:

|  | Percent | Percent |
|---|---|---|
| Sugar | 9.0 | 8.5 |
| Propylene Oxide | 91.0 | 85.9 |
| Xylene |  | 5.6 |

The product was water-insoluble and xylene-soluble.

Example 4b

The reactant employed was the end product in Example 3b, preceding. The autoclave was charged with 759 grams of this material, representing 64.5 grams of sucrose, 652 grams of propylene oxide and 42.5 grams of xylene. No sodium methylate was added in this particular operation. 270 grams of ethylene oxide were added in the manner described previously in foregoing examples. The ethylene oxide reacted within a ten-minute period. The maximum temperature was 170° C., and the maximum pressure was 150 pounds per square inch. The composition of the resultant product on both the xylene-containing and the xylene-free basis is shown in the following table:

|  | Percent | Percent |
|---|---|---|
| Sugar | 6.5 | 6.2 |
| Propylene Oxide | 66.1 | 63.4 |
| Ethylene Oxide | 27.4 | 26.2 |
| Xylene |  | 4.2 |

The product was both water-soluble and xylene-soluble.

Example 5b

The initial reactant employed was the product previously described as Example 3b. 768 grams of this material were charged into the autoclave. This was equivalent to 65 grams sucrose, 666 grams of propylene oxide, and 43 grams of xylene. No addition of sodium methylate was made in this operation. There were employed in the oxyalkylation 785 grams of propylene oxide. The time required to add this propylene oxide was 30 minutes. The temperature varied from 150° C. to 185° C. The maximum gauge pressure was 200 pounds per square inch. The composition of the product on a xylene-containing and a xylene-free basis was as follows:

|  | Percent | Percent |
|---|---|---|
| Sugar | 4.3 | 4.2 |
| Propylene Oxide | 95.7 | 93.0 |
| Xylene |  | 2.8 |

The product was xylene-soluble and water-insoluble.

Example 6b

There were charged into the autoclave 456 grams of the material resulting from the previous example, that is, Example 5b. This was equivalent to 20 grams of sucrose, 442 grams of propylene oxide, and 14 grams of xylene. This reactant was combined in the same manner as previously with 232 grams of ethylene oxide. No sodium methylate was added during this operation. The time required to add the ethylene oxide was 30 minutes. The maximum temperature during this operation was 170° C. The maximum pressure was 200 pounds per square inch. The composition of the material, both on a xylene-containing and a xylene-free basis, was as follows:

|  | Percent | Percent |
|---|---|---|
| Sugar | 2.9 | 2.8 |
| Propylene Oxide | 63.7 | 62.4 |
| Ethylene Oxide | 33.4 | 32.8 |
| Xylene |  | 2.0 |

The product was both water-soluble and xylene-soluble.

Example 7b

The procedure employed was the same as in the previous example and the reactant employed, as in the previous example, was the product previously identified as Example 5b. 594 grams of produce, Example 5b, were used. This represented 25 grams of sucrose, 552 grams of propylene oxide, and 17 grams of xylene. To this there were added 495 grams of propylene oxide. There was no catalyst added during this operation. One result was that the operation went fairly slowly and required six hours at a maximum temperature of 175° C., and a maximum pressure of 250 pounds per square inch. The composition of the final product is shown in the following table:

|  | Percent | Percent |
|---|---|---|
| Sugar | 2.3 | 2.25 |
| Propylene Oxide | 97.7 | 96.20 |
| Xylene |  | 1.55 |

This product was water-insoluble and possibly could be considered as water-dispersible to a degree. It was xylene-soluble.

Following the same procedure I have prepared a large number of derivatives from sucrose which were xylene-soluble. I have used propylene oxide in substantially every instance, either alone or in combination with ethylene oxide or glycide. Butylene oxide, except for its cost, of course, could be used to replace propylene oxide mole for mole with less required to give the same effect. Subsequent reference will be made to the figure which is a conventional representation of compositions involving sucrose, ethylene oxide and propylene oxide. The following table is a summary of part of the products prepared:

| Example No. | Sucrose | Propylene Oxide | Ethylene Oxide |
|---|---|---|---|
|  | Percent | Percent | Percent |
| 1b | 25.4 | 74.6 | 0 |
| 2b | 19.0 | 55.0 | 0 |
| 3b | 9.0 | 91.0 | 0 |
| 4b | 6.0 | 66.0 | 28.0 |
| 5b | 4.0 | 96.0 | 0 |
| 6b | 3.0 | 64.0 | 33.0 |
| 7b | 2.0 | 98.0 | 0 |
| 8b | 6.0 | 48.0 | 46.0 |
| 9b | 3.0 | 3.5 | 62.0 |
| 10b | 5.0 | 27.0 | 68.0 |
| 11b | 18.0 | 77.0 | 5.0 |
| 12b | 24.0 | 64.0 | 12.0 |
| 13b | 27.0 | 55.0 | 18.0 |
| 14b | 37.0 | 55.0 | 8.0 |
| 15b | 12.0 | 54.0 | 34.0 |
| 16b | 17.0 | 36.0 | 47.0 |
| 17b | 5.0 | 95.0 | 0 |
| 18b | 6.0 | 94.0 | 0 |
| 19b | 7.0 | 93.0 | 0 |
| 20b | 8.0 | 92.0 | 0 |
| 21b | 10.0 | 90.0 | 0 |

It will be noted that Examples 1b to 7b, inclusive, correspond to those described in greater detail above. The same procedure was employed in the preparation of all these compounds, i. e., the presence of sodium methylate as a catalyst to the extent of about 1% to 3% of the various oxyalkylations. The initial operation was started at 150° and the temperature of reaction varied from 150° to 200° C. as the maximum. Usually maximum pressure during oxypropylation was not over 200 pounds per square inch but in some instances was as high as 250 pounds per square inch. Thus, the pressure range was from 150 pounds per square inch up to 250 pounds per square inch. In all these experiments where propylene oxide and ethylene oxide both were added the propylene oxide was added first and then the ethylene oxide.

In a second series of examples where both propylene oxide and ethylene oxide were used, the procedure was to add ethylene oxide first and then propylene oxide.

Finally, the same series of examples were repeated, using random oxyalkylation as far as the ethylene oxide and propylene oxide were concerned, i. e., the two products were mixed in the predetermined proportion to give the composition desired and oxyethylation and oxypropylation allowed to take place simultaneously and in a random fashion.

*Example 22b*

The same piece of equipment was used as previously described, i. e., an autoclave, although in the instant experiment involving the use of glycide there was no pressure involved and certain changes were made as noted subsequently. The autoclave was equipped with a water-cooled condenser which was shut off when used as an autoclave. It was equipped also with a separatory funnel and an equalizing pressure tube so that liquid, such as glycide, could be fed continuously at a dropwise or faster rate into the vessel and the rate was controlled by visual examination. For convenience, this piece of equipment is referred to as an autoclave because it was designed essentially for such use but it is to be noted it was not so used when glycide was employed as the alkylene oxide.

There were charged into the autoclave the same reactants (sucrose, xylene and sodium methylate) as in Example 1b. The autoclave was sealed, swept with nitrogen gas and started immediately and heat applied. The temperature was allowed to rise to 120° C. The glycide employed was comparatively pure. Over a period of 2½ hours, 230 grams of glycide were used. This was charged into the upper reservoir vessel which had been flushed out previously with nitrogen and was the equivalent of a separatory funnel. The glycide was started slowly into the reaction mass at a dropwise rate. The reaction started immediately and the temperature rose approximately 12° to 18° C. Cooling water was run through the coils so the temperature for addition of glycide was controlled within the range roughly of 112° to 133° C. This reaction took place at atmospheric pressure with simply a small stream of nitrogen passing into the autoclave at the very top and passing out of the open condenser so as to avoid any possible entrance of air. The product at all times, particularly when the xylene was evaporated, was water-soluble. This product was subsequently subjected to oxypropylation so as to introduce sufficient propylene oxide so that the final product on a xylene-free basis represented sucrose 4% by weight, glycide 2% by weight, and propylene oxide 94% by weight.

Needless to say that glycide can be introduced in any other manner suggested by previous examples, for instance, the product can be oxypropylated first and glycide used in place of ethylene oxide, using about one-half to three-fourths the weight of glycide to replace a predetermined weight of ethylene oxide; or for that matter at any point where ethylene oxide is being used part of the ethylene oxide can be replaced by glycide.

In addition to ethylene oxide, propylene oxide, glycide, or mixtures of the two, or all three of these oxides, one can use also methyl glycide and butylene oxide. Butylene oxide, if employed at all, should be used in combination with ethylene oxide, glycide or methyl glycide. The most desirable combination is, of course, one in which the oxyalkylated derivative shows marked surface activity which can be readily detected by an emulsification test as explained in the text immediately following.

The most desirable derivatives appear to be those which have not only the solubility characteristics previously described but have a hydrophile-hydrophobe balance so as to give them the property of an emulsifier at least to a significant degree.

To determine such preferred hydrophile-hydrophobe balance all that one need do is have a xylene solution within the range of 50 to 90 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. I prefer simply to use the xylene diluted derivatives, which are described elsewhere, for this test rather than evaporate the solvent and employ any more elaborate tests.

Reference is made to the hereto attached figure which is presented in conventional manner showing the compounds derived from various combinations of sucrose and ethylene oxide, sucrose and propylene oxide, or sucrose and both ethylene and propylene oxides. It is to be noted in the hereto appended claims that the invention is not concerned with water-soluble derivatives as, for example, oxyethylated sucrose. It is concerned with such derivatives in which the hydrophile character of sucrose has been radically altered so that the derivative is xylene-soluble. In a more restricted sense the invention is concerned with types of oxalkylated derivatives which are both xylene-soluble and water-soluble. Furthermore, a number of such derivatives show preferred hydrophobe-hydrophile balance as indicated by a simple emulsification test. My preferred reagents come within the approximate trapezoidal area defined by points 1, 2, 3, and 4 on the accompanying figure.

It is obvious, of course, that minor variations can be made without detracting from the spirit of the invention. For instance, one hydroxyl or two hydroxyls of sucrose could be converted into acetate groups. As another variant, in addition to the oxides enumerated, one might inject one or more moles of some other alkylene oxide such as 1-methyloxy-2,3-epoxypropane, 1-ethyloxy-2,3-epoxypropane, and 1-propyloxy-2, 3-2-poxypropane. Such obvious variants in such a large molecule would have little or no effect in changing the general characteristic property, i. e., hydrophobe-hydrophile balance, xylene solubility and water and xylene solubility, etc. Such obvious variants which do not detract from the significant characteristics and properties are all within the scope of the instant invention.

For reasons which are obvious it is substantially impossible to use conventional methods and obtain a single glycol ether from even a monohydric reactant or its equivalent. The reactant herein employed and subjected to oxyalkylation is polyhydric which means that the situation is even more complicated. Actually one obtains a cogeneric mixture of closely related or touching homologues. These materials invariably have high molecular weights and cannot be separated from one another by any known method without decomposition. The properties of such a mixture represent the contribution of various individual members of the mixture.

Even if one were concerned with the monohydric reactant one cannot draw a single formula and say that by following such and such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally. In the instant case where one is concerned with the polyhydric reactant there is little or nothing to be gained by compiling and including such variety of possible formulas.

Simply by way of illustration reference is made to the copending application of De Groote, Wirtel and Pettingill, Serial No. 109,791, filed August 11, 1949.

However, momentarily referring again to a monohydric initial reactant it is obvious that if one selects any such simple hydroxylated compound and subjects such compound to oxyalkylation, such as oxyethylation, or oxypropylation, it becomes obvious that one is really producing a polymer of the alkylene oxide except for the terminal group. This is particularly true where the amount of oxide added is comparatively large, for instance, 10, 20, 30, 40, or 50 units. If such a compound is subjected to oxyethylation so as to introduce 30 units of ethylene oxide, it is well known that one does not obtain a single constituent, which, for the sake of convenience, may be indicated as $RO(C_2H_4O)_nOH$. Instead, one obtains a cogeneric mixture of closely related homologues, in which the formula may be shown as the following: $RO(C_2H_4O)_nH$, wherein as far as the statistical average goes, is 30, but the individual members present in significant amount may vary from instances where $n$ has a value of 25, and perhaps less, to a point where $n$ may represent 35 or more. Such mixture, is, as stated, a cogeneric closely related series of touching homologous compounds. Considerable investigation has been made in regard to the distribution curves for linear polymers. Attention is directed to the article entitled "Fundamental principles of condensation polymerization," by Paul J. Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description.

Actually from a practical standpoint, and particularly in regard to the sub-gems illustrated by the figure, it is much more satisfactory to describe the ultimate composition in terms of the reactants, i. e., sucrose and propylene oxide, or sucrose and both propylene oxide and ethylene oxide. The reason for this statement is obvious and again, for further discussion of the principle involved, reference is made to the aforementioned De Groote, Wirtel and Pettingill co-pending application.

For sake of preserving a line of demarcation from another invention which may or may not involve sucrose and involves alkylene oxides, such as propylene oxide particularly, I direct attention to the following. Allyl sucrose can be prepared so as to have approximately 3 to 6 allyl radicals per sucrose molecule. See Zief and Yanovsky, Ind. Eng. Chem., vol. 41, p 1697 (1949).

Similarly, one can prepare allyl starch and allyl dextrine. I have found that if allyl sucrose is polymerized, particularly by blowing with air so as to yield a viscous liquid or one which is not only viscous but also stringy, or one which is polymerized even further so that even a 50% solution in xylene is stringy, that such material can be treated with an alkylene oxide, particularly propylene oxide, or propylene and ethylene oxide, in exactly the same manner as herein described, to yield products which are valuable for all the purposes herein described in regard to sucrose derivatives, and particularly valuable for demulsification. Such allyl sucrose, or other allyl carbohydrates can be polymerized alone or copolymerized with other allyl-containing derivatives which may, or may not be hydroxylated, such as glycerol alpha-allyl ether, tri-allyl ether of glycerol, the di-allyl ether of glycerol, compounds obtained by treating allyl alcohol with several moles of glycide, and particularly a variety of materials such as those described in U. S. Patent No. 2,450,234, dated September 28, 1945, to Evans and Shokal, and U. S. Patent No. 2,336,093, dated December 7, 1943, to Grün and Stoll. Many of such examples are free from any radical, at least prior to polymerization, having more than 7 carbon atoms. A number are water-soluble prior to polymerization or even thereafter. However, copolymerization can take place between allyl sucrose and allyloleate, allyl ricinoleate; or with total and fractional esters derived from detergent-forming monocarboxy acids having 8 to 22 carbon atoms, such as higher fatty acids, naphthenic acids, abietic acids, and the allyl ether of glycerol, diglycerol, or diallyl ether of glycerol; and polycarboxy acids can be employed also in preparation of various allyl derivatives suitable for polymerization or co-polymerization. As previously stated the oxyalkylation derivatives which are analogous to the sucrose derivatives herein described constitute an entirely separate invention and at not included herein.

PART 2

Attention is directed to the fact that the herein described compounds, compositions and the like which are particularly adapted for use as demulsifiers for water-in-oil emulsions as found in the petroleum industry are hydroxylated derivatives, i. e., carry or include a terminal hydroxyl radical as part of their structure. I have found that if such hydroxylated compound or compounds are reacted further so as to produce entirely new derivatives, such new derivatives have the properties of the original hydroxylated compound insofar that they are effective and valuable demulsifying agents for resolution of water-in-oil emulsions as found in the petroleum industry, as break inducers in doctor treatment of sour crude, etc.

Such hydroxylated compounds can be treated with various reactants such as glycide, epichlorohydrin, dimethyl sulfate, sulfuric acid, maleic anhydride, ethylene imine, etc. If treated with epichlorohydrin or monochloroacetic acid the resultant product can be further reacted with a tertiary amine such as pyridine, or the like, to give quaternary ammonium compounds. If treated with maleic anhydride to give a total ester the resultant can be treated with sodium bisulfite to yield a sulfosuccinate. Sulfo groups can be introduced also by means of a sulfating agent as previously suggested, or by treating the chloroacetic acid resultant with sodium sulfite.

However, the class of derivatives most readily prepared in wide variety are the esters of monocarboxy and polycarboxy acids.

Assuming a typical derivative which can be indicated thus:

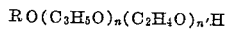

the ester of the monocarboxy acid is as follows:

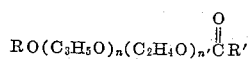

The acid ester of a dicarboxy acid is as follows:

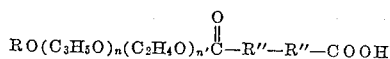

The complete ester of a dicarboxy acid is as follows:

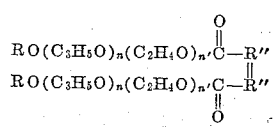

The chloroacetic acid ester is as follows:

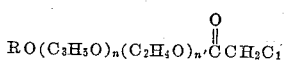

The quaternary compound obtained by reacting the above-mentioned product with pyridine is as follows:

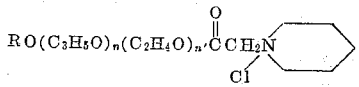

Among the various kinds of monocarboxy acids suitable for preparation of esters are the alpha halogen monocarboxylic acids having not over 6 carbon atoms. Typical acids exemplifying this class are chloroacetic acid, dichloroacetic acid, bromoacetic acid, alphabromobutyric acid, etc. Needless to say, in this instance and all others where reference is made to the acid the functional equivalent such as the acylchloride, the anhydride, the ester, the amide, etc., may be employed.

Another class of esters are those obtained from certain drastically-oxidized hydroxy acetylated castor oil fatty acids. The drastically-oxidized acetylated ricinoleic acid compounds are employed to furnish the acyl radical of the ester. In this particular instance, as in all other instances, one may prepare either a total ester or a partial ester, and when carboxy acids are employed one may have not only partial esters which have residual hydroxyl radicals or residual carboxy radicals, but also partial esters in which both are present.

A somewhat similar type of ester is obtained from hydroxy acetylated drastically-oxidized castor oil fatty acids. It is to be pointed out that hydroxy acetylation may take place first, and drastic oxidation subsequently, or the reverse may be true, or both procedures may be conducted simultaneously. In any event, such products supply acyl radicals of one type of ester herein included.

Another somewhat similar class are esters obtained from hydroxy acetylated drastically-oxidized dehydrated ricinoleic acid. In this class ricinoleic acid, castor oil, or the like, is subjected to dehydration as an initial step. Such products may be employed to supply the acyl radical of one type of ester herein included.

Another type of ester which may be employed is a sulfo fatty acid ester in which there is present at least 8 and not more than 22 carbon atoms in the fatty acid radical. The sulfo radical includes both the acid sulfonates and the sulfonic acids. Briefly stated, suitable sulfo acids herein employed as reactants are sulfo oleic, sulfo ricinoleic, sulfo aromatic fatty acids obtained, for example, from benzene, toluene, xylene, etc., and oleic acid or some other unsaturated acid.

Another class of acids are polycarboxy acids such as commonly used in forming plasticizers, polyester resins, etc. One may use a tricarboxy acid, such as tricarballylic acid, or citric acid, but my preference is to employ a dicarboxy acid, or acid anhydride, such as oxalic acid, maleic acid, tartaric acid, citraconic acid, phthalic acid, adipic acid, succinic acid, azeleic acid, sebacic acid, adduct acids obtained by reaction between maleic anhydride and citraconic anhydride, and either butadiene or cyclopentadiene. Oxalic acid is not quite as satisfactory as some of the other acids, due to its tendency to decompose. In light of raw material costs it is my preference to use phthalic anhydride, maleic anhydride, citraconic anhydride, diglycollic acid, adipic acid and certain other acids in the same price range which are both cheap and heat-resistant. One may also use adduct acids of the diene or clocker type.

Another class of esters are derived from certain high, molal monocarboxy acids. It is well known that certain monocarboxy organic acids containing 8 carbon atoms or more, and not more than 32 carbon atoms, are characterized by the fact that they combine with alkalies to produce soap or soaplike materials. These detergent-forming acids include fatty acids, resin acids, petroleum acids, etc. For the sake of convenience, these acids will be indicated by the formula R.COOH. Certain derivatives of detergent-forming acids react with alkali to produce soap or soaplike materials and are the obvious equivalent of the unchanged or unmodified detergent-forming acids. For instance, instead of fatty acids one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and, of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

The monocarboxy detergent-forming esters of the oxyalkylated derivatives herein described, are preferably derived from unsaturated fatty acids having 18 carbon atoms. Such unsaturated fatty acids include oleic acid, ricinoleic acid, linoleic acid, etc. One may employ mixed fatty acids as, for example, the fatty acids obtained from hydrolysis of cottonseed oil, soybean oil, etc. It is my ultimate preference that the esters of the kind herein contemplated be derived from unsaturated fatty acids, and more especially, unsaturated fatty acids containing a hydroxyl radical, or unsaturated fatty acids which have been subjected to oxidation. In addition to synthetic carboxy acids obtained by the oxidation of paraffins or the like, there is the somewhat analogous class obtained by treating carbon dioxide or carbon monoxide, in the presence of hydrogen or an olefine, with steam, or by causing a halogenated hydrocarbon to react with potassium cyanide and saponifying the product obtained. Such products or mixtures thereof, having at least 8 and not more than 32 carbon atoms, and having at least one carboxyl group or the equivalent thereof, are suitable as detergent-forming monocarboxy acids; and another analogous class equally suitable is the mixture of carboxylic acids obtained by the alkali treatment of alcohols of high molecular weight formed in the catalytic hydrogenation of carbon monoxide.

One may have esters derived not only from a single class of acids of the kind described, but also from more than one class, i. e., one may employ mixed esters such as esters obtained, for example, from high molal detergent-forming acids having 8 to 22 carbon atoms, as previously described, in combination with acids of the alpha halogen carboxy type having less than 8 carbon atoms, such as chloroacetic acid, bromoacetic acid, etc., as previously described.

Drastically-oxidized oil, such as drastically-oxidized castor oil, or drastically-oxidized dehydrated castor oil, may be employed to supply the acyl radical. In other instances, one may produce mixed esters by using polycarboxy acids, such as phthalic acid, diglycollic acid, etc., in combination with detergent-forming acids, such as oleic acid, stearic acid, naphthenic acid, etc. Other carboxy acids may be employed in which there is also a sulfo group present, such as sulfo phthalic, sulfo benzoic, sulfo succinic, etc. Esters may be obtained from low molal hydroxylated acids having less than 8 carbon atoms, such as hydroxyacetic acid, lactic acid, etc. Similarly, one may employ low molal aliphatic acids having less than 8 carbon atoms, such as acetic acid, butyric acid, etc. Similarly, one may employ low molal acids having the vinyl radical, such as acrylic acid, methacrylic acid, crotonic acid, etc. It will be noted that these acids contain various numbers of acyl radicals varying generally up to 22 carbon atoms for the monocarboxy acids, and as many as 36 carbon atoms in the case of certain polycarboxy acids, particularly the dimer obtained by the dimerization of 9.11-octadecandienic acid. As to this particular product, see U. S. Patent No. 2,347,562, dated April 25, 1944, to Johnston.

Other suitable acids are cyclic monocarboxy acids having not over 32 carbon atoms. Examples of such acids include cyclohexane acetic acid, cylohexane butyric acid, cyclohexane propionic acid, cyclohexane caproic acid, benzoic acid, salicylic acid, phenoxy acetic acid, etc.

The preparation of such esters are conventional and do not require elaborate description. Generally speaking, my procedure is to react the appropriate amount of a selected hydroxylated compound with the free acid in presence of a high boiling solvent, such as xylene, using 1% or 2% of para-toluene sulfonic acid along with a phase-separating trap until the amount of water indicates the reaction is complete, or substantially complete. The time required is usually 4 to 20 hours. Such esters are, as previously stated, very effective for resolution of water-in-oil emulsions as found in the petroleum industry.

Having thus described my invention what I claim as new and desire to secure by Letters Patent, is:

1. Hydrophile synthetic products, said hydrophile synthetic products being xylene soluble; said hyprophile synthetic products being oxyalkylation products of sucrose with at least one alkylene oxide of the class consisting of ethylene oxide, propylene oxide, butylene oxide, glycide and methyl glycide, at least part of the alkylene oxide being selected from the class consisting of propylene oxide and butylene oxide, the proportion of sucrose radical in such product being less than 10% (weight basis) of the total on the assumption of completeness of reaction and on the average statistical basis.

2. Products of claim 1 with the proviso that the alkylene oxide constituent include both ethylene oxide and propylene oxide and that the relative proportions of the sucrose, ethylene oxide and propylene oxide be within the ranges of about 2 to about 7% sucrose, about 23 to about 70% ethylene oxide, and about 23 to about 70% propylene oxide, the total of the three being 100%.

MELVIN DE GROOTE.

References Cited in the file of this patent

UNITED STATES PATENTS

| Number | Name | Date |
|---|---|---|
| 1,863,208 | Schorger | June 14, 1932 |
| 2,450,079 | Brown | Sept. 28, 1948 |

OTHER REFERENCES

Le Maistre et al.: J. Org. Chem. 13 (1948), pp. 782–785.